United States Patent
Keuffer et al.

(10) Patent No.: US 10,785,036 B2
(45) Date of Patent: Sep. 22, 2020

(54) METHOD FOR GENERATING AN ELECTRONIC SIGNATURE OF A DOCUMENT ASSOCIATED WITH A CONDENSATE

(71) Applicant: IDEMIA IDENTITY & SECURITY FRANCE, Issy-les-Moulineaux (FR)

(72) Inventors: Julien Paul Keuffer, Issy les Moulineaux (FR); Herve Chabanne, Issy les Moulineaux (FR); Emmanuel Prouff, Issy les Moulineaux (FR); Olivier Clemot, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 222 days.

(21) Appl. No.: 15/833,822

(22) Filed: Dec. 6, 2017

(65) Prior Publication Data
US 2018/0159689 A1    Jun. 7, 2018

(30) Foreign Application Priority Data
Dec. 7, 2016    (FR) ..................... 16 62089

(51) Int. Cl.
H04L 29/06    (2006.01)
H04L 9/32    (2006.01)
H04L 9/06    (2006.01)

(52) U.S. Cl.
CPC .......... H04L 9/3247 (2013.01); H04L 9/0643 (2013.01); H04L 9/3218 (2013.01);
(Continued)

(58) Field of Classification Search
CPC ... H04L 9/0643; H04L 9/3247; H04L 9/3218; H04L 9/3236; H04L 9/3221; H04L 63/123; H04L 9/3239; H04L 2209/30
See application file for complete search history.

(56) References Cited

U.S. PATENT DOCUMENTS 10,027,654 B2 *   7/2018  Bringer ............... H04L 9/3221
2004/0117630 A1 *   6/2004  Furukawa ........... H04L 9/3221
                                                    713/176
(Continued)

FOREIGN PATENT DOCUMENTS

EP    3010177 A1    4/2016

OTHER PUBLICATIONS

Preliminary Research Report and Written Opinion received for French Application No. 1662089, dated May 22, 2017, 3 pages (1 page of French Translation Cover Sheet and 2 pages of original document).

(Continued)

*Primary Examiner* — Amir Mehrmanesh
(74) *Attorney, Agent, or Firm* — Womble Bond Dickinson (US) LLP

(57) ABSTRACT

The present invention relates to a method for generating an electronic signature of a document associated with a condensate obtained by a given hash function comprising performing by data-processing means (11b) of a server (10b) of steps of:

(a) Receiving said condensate and a zero-knowledge proof of the fact that said condensate is indeed the result of application of said given hash function to said document;

(b) Verifying that said zero-knowledge proof is valid;

(c) Generating an electronic signature of the document from said condensate.

17 Claims, 2 Drawing Sheets

(52) U.S. Cl.
CPC .......... *H04L 9/3221* (2013.01); *H04L 9/3236* (2013.01); *H04L 9/3239* (2013.01); *H04L 63/123* (2013.01); *H04L 2209/30* (2013.01)

(56) References Cited

U.S. PATENT DOCUMENTS

2011/0246779 A1* 10/2011 Teranishi .............. H04L 9/3013
                                                    713/176
2018/0096551 A1*  4/2018 Kraemer ................ G07C 13/00

OTHER PUBLICATIONS

Pano et al., "Pinocchio: Nearly Practical Verifiable Computation", in Proceedings of the IEEE Symposium on Security and Privacy, IEEE, May 21, 2013, 23 pages.

Goldreich et al., "Collision-free hashing from lattice problems", Technical report, 1996, 11 pages.

Giacomelli et al., "ZKBoo: faster zero-knowledge for Boolean circuits", Usenix Security Symposium, 2016, 15 pages.

European Search Report received for EP Patent Application No. 17205943, dated Dec. 20, 2017, 2 pages.

Costello et al., "Geppetto: Versatile Verifiable Computation", in Proceedings of the IEEE Symposium on Security and Privacy, IEEE, May 18, 2015, 18 pages.

Brandon, Lum Jia Jun, "Implementing Zero-Knowledge Authentication with Zero Knowledge (ZKA_wzk)", The Python Papers Monograph vol. 2, No. 9, Proceedings of PyCon Asia-Pacific 2010, 2010, pp. 1-19, Available at <http://ojs.pythonpapers.org/index.php/tppm/article/view/155>.

Ben-Sasson et al., "SNARKs for C: Verifying Program Executions Succinctly and in Zero Knowledge", In Proceedings of the 33rd Annual International Cryptology Conference, CRYPTO '13, 72 pages.

Ben-Sasson et al., "Scalable Zero-Knowledge via Cycles of Elliptic Curves", CRYPTO 2014, 47 pages.

* cited by examiner

METHOD FOR GENERATING AN ELECTRONIC SIGNATURE OF A DOCUMENT ASSOCIATED WITH A CONDENSATE

GENERAL TECHNICAL FIELD

The present invention relates to the field of authentication, and in particular to a method for electronic signature of a confidential document.

STATE OF THE ART

The electronic signature of an electronic document ensures the integrity of the document, authenticates its author, and does this definitively (non-repudiation), by analogy with the handwritten signing of a paper document.

It is common for an emitter of a document to contract generation of the electronic signature out to a provider, called the Signature Solution Provider (SSP). In fact, to be officially valid, the method for electronic signature must be certified by a competent authority, as is the case of the SSP (implementation of this cryptographic primitive necessary for signature in fact requires specific competencies, with secure storage of secret key difficult to carry out in practice). For this purpose, the client (emitter of the document) uploads the document onto a server of the SSP for the latter to affix the signature.

In practice, the electronic signature is not done on the complete document but on a condensate of the latter (also called a "cryptographic imprint" or "hash" of the document), obtained by applying a cryptographic hash function to the document. The condensate has a fixed size and the signature primitive is applied to an element which is constructed from this condensate. Also, the condensate reveals nothing on the document: the original document cannot be found again from this condensate, in any case as the hash function used is considered secure. The condensate can however be recomputed from the message to verify that it is correct.

If the document to be signed contains sensitive information, the client can choose not to reveal it to his electronic signature provider. To the extent where only the condensate is necessary to generate the signature of a document, it could be possible that the client can transmit the SSP only a condensate of the message.

But today this is not feasible: since the original document cannot be found from its condensate, the SSP should produce a signature of a document it has not seen. Yet, actually producing a signature engages it from a legal viewpoint, hence the current refusal by any SSP to generate an electronic signature if there is no access to the document (a dishonest client could provide the condensate of a document which is not from him to attribute paternity).

In summary, today the emitter of a confidential document who wants a signature to be generated for this document can only:
either supply the clear document to a SSP and trust him with it;
or generate the signature himself, though it is necessary to have specific competence, be certified by an authority and to provide the computing power himself.

Mechanisms of electronic signature called "blind" are known, for signing a document which has been masked (the mask can be removed after generation of the signature), so that the signatory cannot know its content. This mechanism is widely used in protocols for electronic voting or virtual cash, but proves unuseful for resolving the present problem: the masked document admittedly could be sent to the SSP without violating confidentiality, but the latter would not always accept generating the signature due to the need to verify that the condensate does correspond to this masked document. Also, the signature obtained after demasking is not a standard signature in terms of ISO standards or the NIST.

It would consequently be preferable to have a solution allowing emitters of document to continue delegating generation of a signature to SSP with the same level of security and reliability and eliminate the need to transmit the clear document, and do this fast and efficiently.

PRESENTATION OF THE INVENTION

In a first aspect, the present invention relates to a method for generating an electronic signature of a document associated with a condensate obtained by a given hash function comprising performing by data-processing means of a server of steps of:
(a) Receiving said condensate and a zero-knowledge proof of the fact that said condensate is indeed the result of application of said given hash function to said document;
(b) Verifying that said zero-knowledge proof is valid;
(c) Generating an electronic signature of the document from said condensate.

In other advantageous and non-limiting features:
step (c) comprises application to the condensate of a function parameterized by a private key of an emitter of the document;
the zero-knowledge proof is a cryptographic object of zkSNARK type;
said given hash function is a cryptographic hash function iterating a compression function as per the Merkle-Damgard principle;
said given hash function is selected from the functions of the SHA-1 and SHA-2 families;
said zero-knowledge proof of the fact that said condensate is indeed the result of application of said given hash function to said document is a zero-knowledge proof of the fact that the equipment 10a has a pre-image such that said condensate is indeed the result of application of an iteration of the compression function to said pre-image;
the method comprises a prior step (a0) of generation, by data-processing means of equipment having said document, of said zero-knowledge proof of the fact that said condensate is indeed the result of application of said given hash function to said document;
step (a0) further comprises prior generation of said condensate by application of said given hash function to said document;
step (c) comprises transmission of the generated electronic signature to said data-processing means of the equipment;
the method comprises a subsequent step (d) of association by the data-processing means of the equipment of the electronic signature with the document so as to form the signed document;
step (a0) comprises prior receipt by the processing means of the equipment of a nonce, and generation of a condensate of a concatenation of the document and of the nonce completed by a padding block;

step (a) comprises receipt of the nonce completed by a padding block, and of said condensate of a concatenation of the document and of the nonce completed by the padding block;

said zero-knowledge proof of the fact that the equipment has a pre-image such that said condensate is indeed the result of application of at least one iteration of the compression function to said pre-image, is a zero-knowledge proof of the fact that the condensate of the document and the condensate of the concatenation of the document and of the nonce completed by the padding block are related by a given relation;

said given relation between the condensate of the document and the condensate of the concatenation of the document and of the nonce completed by the padding block is selected from a plurality of predetermined relations, step (b) comprising the determination of said relation as a function of the value received of the nonce completed by the padding block, and the verification of the proof as a consequence;

step (a0) comprises the determination of the padding block completing the nonce and the choice of said given relation between the condensate of the document and the condensate of the concatenation of the document and of the nonce completed by the padding block, as a function of lengths of said document and/or of the nonce.

In a second and a third aspect, the invention proposes a computer program product comprising code instructions to execute a method according to the first aspect of generation of an electronic signature of a document associated with a condensate; and storage means readable by computer equipment on which a computer program product comprises code instructions to execute a method according to the first aspect of generation of an electronic signature of a document associated with a condensate.

PRESENTATION OF THE FIGURES

Other features and advantages of the present invention will become apparent on reading the following description of a preferred embodiment. This description is given with reference to appended drawings, in which.

DETAILED DESCRIPTION

Architecture

Figure 1:
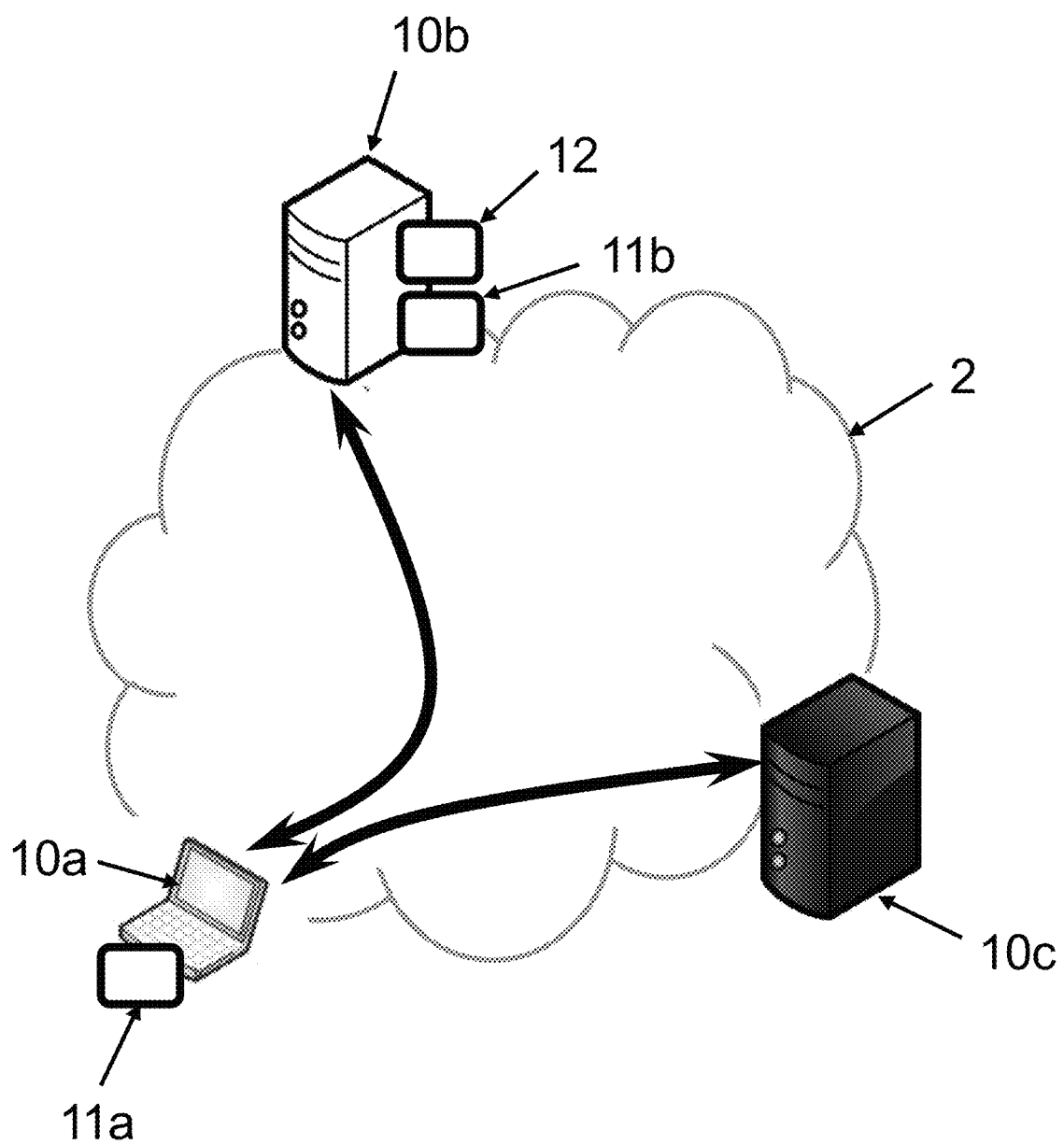
FIG. 1 is a diagram of architecture for performing the methods according to the invention.

With reference to FIG. 1, a method is proposed for generating an electronic signature of a document performed within architecture such as shown. The document is associated with a condensate obtained by a given hash function.

As explained, a hash function inputs a message of arbitrary size (the original document) and produces a condensate of fixed size associated with this message. Here, said given hash function is advantageously a function known as cryptographic, i.e., with additional properties: the condensate is statistically well distributed throughout all arrival values, and it is impossible in a reasonable time to find two messages which have the same condensate (resistance to collisions) and a message which has attained this value cannot be found from the condensate (resistance to pre-image computation).

The hash functions constructed by using the Merkle-Damgard principle (to be specified later), i.e., iterating a so-called compression function, are examples of cryptographic hash functions which are advantageously selected for the present method. The example will be taken of functions of the SHA ("Secure Hash Algorithm") family, standardized by the NIST ("National Institute of Standards and Technology"), in particular the SHA-1 or SHA-2 (especially SHA-256) sub-families.

The present method is indeed a method "for generating an electronic signature of a document", and not "for signing a document". This means that it produces only the electronic signature of the document and not yet the "signed document", i.e. the association of the original document and of the signature, generally in any container.

"Electronic signature" of a document means the classic definition of this term, specifically a cryptographic primitive for identifying the signatory and ensuring that the document has not been altered from the time when the signature was produced and is definitely the original document (throughout the present description, the document from which the condensate comes will be designated as "original"). This cryptographic object generally consists of a cypher of the condensate of the document by way of an asymmetrical encryption function: the signatory uses a private key, and everyone can verify the signature by way of a public key (by comparing the condensate contained in the signature and a recomputed condensate).

More precisely, the standards of signatures such as the standard PKCS #1 v2.2 involve signing a "summary" of fixed size of the document, this summary being obtained from the condensate and padding to produce a predetermined size. It is clear that the data which complete the condense of the document do not depend on the document itself.

In general, it will be considered throughout the present description that the electronic signature is made from the condensate by using a function known to the skilled person, and in a preferred embodiment that the electronic signature is made by modifying the condensate hardly reversibly, by applying a function parameterized by the private key of the signatory (this type of function is called trap function). It should also be noted that according to algorithms of signatures used, the condensate can be completed with padding and masking (to make the signature non-determinist). The skilled person could generate the signature from the condensate by using techniques of his choice.

The present method is essentially implemented via a server $10b$ of a SSP, equipped with data-processing means $11b$ (one or more processors). The server $10b$ can further comprise data-storage means $12$ (a memory) for storing the various cryptographic objects involved.

The server $10b$ can be connected in particular via a network $2$ such as the internet to equipment $10a$ providing said document for which the signature is generated (but transmitting only its condensate as will become evident). The equipment $10a$ is typically a workstation of a document issuing body, i.e. the signatory (client of the SSP).

The equipment $10a$ can itself be connected to other third-party servers $10c$ to which it could transmit the signed document once the server $10b$ will have sent it the generated electronic signature.

Method for Generating Signature

The present method for generating electronic signature is performed by the data-processing means $11b$ of the server $10b$ from an imprint of said document for which the signature is wanted.

More precisely, the server 10b will receive (from the equipment 10a) the condensate of the original document, but not the document itself which can stay confidential.

However, the present method enables execution of signature operations on a condensate with strong guarantee on the fact that this condensate is related to a document validly possessed by the client, in other words enables signing a confidential original document without having direct access to this document.

For this, a cryptographic protocol is used, generating "proof" that the condensate which is at the origin of the signature is well related to a document, this proof revealing nothing more than the fact that the original document is possessed by the producer of the proof.

The Pinocchio protocol presented in the publication: "Bryan Parno, Craig Gentry, Jon Howell and Mariana Raykova, Pinocchio: Nearly Practical Verifiable Computation, in Proceedings of the IEEE Symposium on Security and Privacy, IEEE, 21 May 2013" was one of the first verifiable computing protocols allowing the performer to compute the application of any function in verifiable manner and the order-giver to verify the associated proof in a computing time shorter than the time needed to perform the computation itself.

In a first step (a), the data-processing means 11b of the SSP server 10b (not having the original document and playing the role of "verifier") receive said condensate and a zero-knowledge proof of the fact that said condensate is indeed the result of application of said given hash function to said original document.

This step is preferably preceded by a prior step (a0) of generation, by the data-processing means 11a of the equipment 10a of the client (having said original document, and playing the role of "prover"), of said zero-knowledge proof of the fact that said condensate is indeed the result of application of said given hash function to said document.

More precisely, said zero-knowledge proof guarantees the following affirmation: "given the condensate of an original document received, the equipment 10a has a document whereof the condensate corresponds to that provided".

This step (a0) further preferably comprises prior generation of said condensate by application of said given hash function to said document (as explained typically of the SHA-1 or SHA-2 families, in particular SHA-256).

Therefore, the condensate can be related to the original document but it is not possible to obtain information on the content of the original document. The cryptographic protocol gives proof that is rapid to verify (less than half a second) and that cannot be falsified: it is near-impossible (probability lower than $\frac{1}{2}^{80}$, even lower than $\frac{1}{2}^{128}$ depending on the parameters chosen to perform proof, which may then be slower to produce) to obtain acceptance of proof of the above assertion if the process did not take place in accordance with specified procedure.

When performing proof, the prover uses the possibility of producing zero-knowledge proof to hide the original document. Therefore, the proof does not give any information on the document itself, other than that the condensate provided is related to this document.

In all cases, in a step (b) the data-processing means 11b of the server 10b verify that said zero-knowledge proof is valid, and if this is the case they generate the electronic signature of the document from said condensate in a step (c). As explained, generation of the signature of step (c) consists typically of application to the condensate of a function parameterized by a private key of an emitter of the document, if needed completed with other elements (padding and masking).

Verification of such proof at step (b) is not interactive (the verifier, i.e. the SSP has no need to contact the prover, i.e. the client) and is done simply in constant time by verifying that the proof is valid, demonstrating (at slight probability) to the server 10b that the alleged property is true, i.e. that the client has a valid document having the received condensate for condensate. It is suggested that the condensate sent to him is licit, despite the absence of the original document.

So once the proof is verified, the condensate alone is considered sufficient for a signature to be generated without risk of usurpation.

By way of the proof (which will be referred to again in more detail hereinbelow), confidentiality can be total (since generation of proof needs no communication between the client and the SSP) without SSP taking a risk since the proof guarantees that the client does have the original message.

The proof is short (very short—of the order of 300 octets—in preferred embodiments to be described below), and transmitting it with the condensate of the document poses no problem in bandwidth. Also, verification of this proof is rapid (in constant time, a few tens of thousandths of seconds), which does not increase the computational load at the data-processing means of the SSP server 10b. Generation of the proof as such is more involved in terms of computation time, but as step (a0) is performed on the equipment 10a side, this additional computation time is the responsibility of the client who so to speak takes responsibility for the extra cost related to the need that the document remains confidential.

Therefore, the present method is optimal both for the client and for the provider of the signature.

Furthermore, step (c) can comprise the transmission of the generated electronic signature to said data-processing means 11a of the equipment 10a (in response to step (a) which constitutes a request for signature), so that a subsequent step (d) for association by the data-processing means 11a of the equipment 10a of the electronic signature with the document can be conducted to form the signed document. The equipment 10a can legally invoke this electronic signature among other entities (servers 10c).

Generation of Proof

Preferably, said zero-knowledge proof is a cryptographic object of zkSNARK type.

zkSNARK stands for: "zero-knowledge Succinct Non Interactive ARgument of Knowledge". It is a cryptographic primitive constructed around the notion of proof. Researchers in theoretical computing and cryptography have long turned their attention to the notion of proof. There exist theoretical results with which it is possible to produce very short, secure proof of an algorithm, but the time needed to perform this proof is out of reach and will remain so despite increases in computing power. One of the reasons is related to the power given to the entity performing the proof: the prover. In theoretical results on proofs, the prover has infinite computing power and, in spite of this, proofs remain secure.

The notion of proof was then relaxed, the protocol only seeking protection from a prover having extensive but limited computing power. The result of the protocol is no longer proof but an argument. It is on the basis of this notion of argument that practical, verifiable computing systems have been constructed. One additional requirement in a system producing an argument is that this argument should be non-interactive: the verifier and the prover do not need to interact to produce the argument.

Since 2010, achievements of zkSNARKs have been presented: these are arguments of short size (a few elements of an elliptical curve), which do not require interactivity and which in addition enable the prover to perform zero-knowledge proof i.e. the proof does not contain any nontrivial information on the inputs provided by the prover.

There are several protocols which effectively perform zkSNARKs, and persons skilled in the art are able to use these indifferently in the present method:

The Pinocchio protocol already mentioned;

The Gepetto protocol, presented in the publication: "Craig Costello, Cedric Fournet, Jon Howell, Markulf Kohlweiss, Benjamin Kreuter, Michael Naehrig, Bryan Parno, and Samee Zahur, Geppetto: Versatile Verifiable Computation, in Proceedings of the IEEE Symposium on Security and Privacy, IEEE, 18 May 2015", which is an improvement on Pinocchio The protocol presented in the publication et seq.: "Eli Ben-Sasson, Alessandro Chiesa, Daniel Genkin, Eran Tromer, Madars Virza. SNARKs for C: Verifying Program Executions Succinctly and in Zero Knowledge. In Proceedings of the 33rd Annual International Cryptology Conference, CRYPTO '13, pages 90-108, 2013", implemented in open-source in the form of a library called libsnark, optimising the protocol producing a zkSNARK in Pinocchio by improving the expressivity thereof i.e. the type of program or algorithm it is possible to verify.

To take the example of the Pinocchio protocol, this protocol comprises several parts:

1. A conventional program is translated into the form of an arithmetic circuit i.e. a set of relations between the inputs and outputs of the program, translated solely using additions and multiplications of elements of a finite body. It is to be noted that all programs, in theory, may be translated into this form, but only one part of these programs allows efficient translation into circuit form.

2. The arithmetic circuit obtained is efficiently represented by means of three families of polynomials to which an additional polynomial is added called a target polynomial. These families of polynomials form "Quadratic Arithmetic Programs" (QAPs). They encode the relations between the inputs and outputs of each multiplication gate of the circuit, the relations of the addition gates being integrated in the first following multiplication gate of the computation.

These QAPs are related to the verifiable computation by the following point: a computation $y=C(x)$ is correct for an input x if and only if all the relations describing the corresponding arithmetic circuit are satisfied by fixing x as input value and y as output value.

In a sense, QAPs allow the compression of all the constraints to be verified into a single relation to be verified: a polynomial constructed from value x and the three QAP families must divide the target polynomial.

3. A cryptographic protocol therefore takes a QAP as input that is associated with a program, generates evaluation and verification keys which use elliptical curves to hide the polynomial relations. The polynomial proving that computation has been correctly performed is then computed directly using the relations hidden in the elliptical curve. The relation of divisibility is translated solely by means of a constant number of elements in the elliptical curve i.e. the proof is of constant size. Verification of this proof is extremely quick.

Additionally, the protocol makes it possible for some computational inputs provided by the prover to be private: it allows hiding of the values of the prover in performance of the proof, by multiplication thereof by a multiple of the target polynomial, which does not modify the fact that the "proof" polynomial is divisible by the target polynomial.

This "proof" polynomial, when hidden in an elliptical curve, consists of a zkSNARK.

The Pinocchio protocol lets anyone producing proof to hide some of the inputs of the computation whereof it offers proof. In the present case, the following computation has to be made:

Input: length of the document M, initialization vector IV

Private input: the document M the condensate h(M) of which is to be computed,

Output: h(M) and proof $\pi$ that the prover knows a document M which hashes into h(M).

It should be noted that there are known protocols provided for generating proof of correct execution of a hash function, which the skilled person could use directly even if they are not optimal. The difficulty is to attain a reasonable computation time for creating the proof and sizes of evaluation keys and verification which are not too consistent.

the Zerocash protocol (IEEE Security & Privacy 2014) of Ben-Sasson et al. proposes the definition of an arithmetic circuit for verifying the compression function of SHA-256 which comprises around 30,000 multiplication gates. This gives an execution time of proof of around 5 seconds (per compression level, verifying the entire hash function which comprises many iterations of the compression function will be clearly longer), which stays high and extensively improvable;

the ZKBoo protocol, presented in the publication "ZKBoo: faster zero-knowledge for Boolean circuits" by Giacomelli, Madsen and Orlandi (Usenix Security 2016)" enables better performances (proof in 50 ms, verification in 70 ms) by iteration of the compression function, but the size of the proof is consequent (800 Ko) even more since it seems to have been measured only on application of the compression function.

Preferred Embodiment

As explained, the major drawback to the Pinocchio method and its known derivatives is needing a considerable computing power on the side of the operator (the data-processing means 11a of the equipment 10a of the client). The production cost of the proof of a computation by this protocol is higher by several orders of magnitude than that of the computation itself.

In practice, it is noted that the SHA-256 function (and more precisely its compression function) comprises many bitwise operations which are poorly adapted to the representation of computations used in the Pinocchio protocol. A first solution for accelerating generation of proof is to change hash function, for example by using hash functions based on subset sums, also called of arithmetic type, since the arithmetic circuit representing the function has fewer multiplication gates. Examples are described in the publication: "O. Goldreich, S. Goldwasser and S. Halevi. Collision-free hashing from lattice problems. Technical report, 1996".

These functions were used in zkSNARKs and described in the publication "E. Ben-Sasson, A. Chiesa, E. Tromer and M. Virza. Scalable Zero-Knowledge via Cycles of Elliptic Curves. CRYPTO 2014".

Yet, the functions of the SHA family are those used most often (as they are standardized), and above all they produce a condensate which will be used to produce the standard signature, once the protocol has ended; this is why it is preferable to have an algorithm which uses it despite poor adaptation to the representation of computations used in the Pinocchio protocol.

In a preferred embodiment the present method dispenses with these difficulties by enabling, as will become evident, digital proof of constant small size (of the order of 300 octets, or several thousand times fewer than for known protocols) to be generated in a few thousandths of seconds, and without revealing anything on the original document, by using properties of the cryptographic hash functions iterating a compression function as per the Merkle-Damgård principle.

Figure 2:
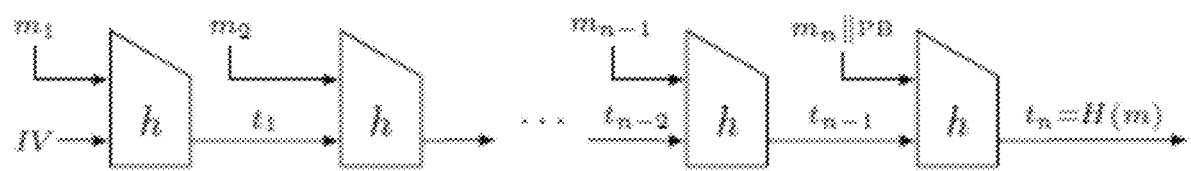
FIG. 2 illustrates the Merkle-Damgard principle.

In reference to FIG. 2, it can be noted that for documents of arbitrary size to be processed, the Merkle-Damgard principle used by the preferred hash functions such as SHA-1 or SHA-2 consists of defining the "compression" function h mentioned prior to inputting a message $m_i$ and a chaining variable of fixed size $t_{i-1}$ (with $t_0$=IV the initialization vector) and whereof the result is a message $t_i$ of lesser size than the initial message. This function h is called compression function as it takes an input of M bit and produces at its output a sequence of N bits with N strictly less than M. In the case of SHA-256 for example the input has a size of 512 bits (i.e. the message is processed block by block of 512-bit size) and the compression function produces a value of 256-bit size.

Next, the compression function is applied recursively to each block of the message until all possible blocks have been exhausted and finally obtains $t_n$=H(m)=h(h( ... h(IV, $m_1$), $m_2$), ..., $m_n$). This principle therefore extends computation of a condensate to any message of any size (less than $2^{64}-1$ for SHA-256).

It should be noted that to hedge against certain attacks, the last block of message $m_n$ is completed by a padding block PB, such that the input of the last occurrence of h is $m_n$||PB. In the case of SHA-256, this block is variable in size but at least equal to 65 bits. It comprises a field announcing the size of the message in bits and means of knowing when this block is finished.

A solution for substantially limiting the generation time of the proof and its size when the hash function applies the Merkle-Damgard principle is to use proof of knowledge of a pre-image of the compression function (in other words the internal state after already several iterations of the function h, in practice one of the values $t_i$, $i \in [[1; n-1]]$, more specifically the final value $t_{n-1}$) rather than necessarily the original document, this proof also showing possession of the document, provided the hash function does have the cryptographic properties expected of it, such as resistance to pre-image computation or statistically well distributed distribution in all possible values. More precisely, instead of proving that he knows $\{m_1, m_2, \ldots m_n\}$, the prover can merely prove that he knows the value $t_{n-1}$, as it verifies (with the last message block $m_n$) that the result obtained by applying a single iteration of the compression function h is equal to the value of the condensate sent to the verifier.

In fact, it can be shown that the affirmations "given the condensate of an original document received, the equipment 10a has a document whereof the condensate corresponds to that provided" and "given the condensate of an original document received, the equipment 10a has a pre-image of the compression function of said hash function whereof the result (application of an iteration of the compression function to said pre-image) corresponds to the condensate provided" are substantially equivalent (both propositions have the same computational difficulty).

For this, a challenge-response mechanism is astutely used. More precisely, studying in more detail the construction of the hash functions based on the Merkle-Damgard diagram allows producing the proof while needing less computation. For a nonce τ (i.e. an arbitrary number, i.e., a number used once, which plays the role of challenge), when expressing the value of H(m) and H(m||τ) by means of the compression function, it becomes apparent that there are quantities common to both expressions. It suffices to prove that the quantities H(m) and H(m||τ) are related to prove that the client has knowledge of a pre-image of the hash function and therefore of the original document.

In most existing protocols of computation verifiable in practical terms, the programs to be verified must not use a control structure which depends on data. This is problematic in this situation since the program computing the condensate of the message must apply the compression function as many times as there are blocks in the document.

In the proof to be produced, the compression function has to be applied a few times, between two and four times according to the size of the last block of the message. But this too is a case where the program producing the proof comprises instructions which are not fixed before the document is known.

To circumvent this, the idea is to modify the length of the nonce r by means of padding (the result is $\tau_{pad}$ which is as will become evident included in the response to the challenge) and produce three proof systems which correspond to the three possible cases listed in Table 1 below.

TABLE 1

| | Relation between H (m) and H (m || τ) as per the size of m | | |
|---|---|---|---|
| | Case n° 1 | Case n° 2 | Case n° 3 |
| l := len($m_n$) | l ≤ 447 | 447 < l < 512 | l = 512 |
| H(m) | h($t_{n-1}$, $m_n$ || $PB_1$) | h(h($t_{n-1}$, $m_n$ || $PB_1$), $PB_2$) | h($t_n$, $PB_1$) |
| $\tau_{pad}$ | $\tau_{pad}$ := 00 ... 0 || τ with $m_n$ || $\tau_{pad}$ ∈ $\{0, 1\}^{512}$ | $\tau_{pad}$ := $PB_1$ || τ | $\tau_{pad}$ := τ |
| H (m || $\tau_{pad}$) | h(h($t_{n-1}$, $m_n$ || $\tau_{pad}$), $PB_2$) | h(h($t_{n-1}$, $m_n$ || $PB_1$), τ || $PB_3$) | h($t_n$, $\tau_{pad}$ || $PB_2$) |

These three cases, based on the example of SHA-256, are related to the requirement that the padding block is of variable size but at least equal to 65 bits if the final block $m_n$ has a length greater than 447 bits (i.e. 512-65) but greater than 512 bits, then the padding block PB should have between 1 and 64 bits, which is not possible. It is then divided into $PB_1$ and $PB_2$ (i.e. PB=$PB_1$||$PB_2$), $PB_1$ completing $m_n$ and $PB_2$ being a complete block of 512 bits compressed in an additional occurrence of h.

Therefore, referring again to the nonce r, for example in the simple case where the document has a length which is a multiple of 512 bit (the last block therefore has a length of 512 bit), the expressions in Table 1 indicate that the client must prove that he knows a value a (which corresponds to $t_n$) such that: $H(m)=h(a, PB_1)$ and $H(m\|\tau)=h(a, \tau\|PB_2)$, with $PB_1$ a length of 512 bit and $PB_2$ the length for completing $\tau$ at 512 bits (which is possible if $\tau$ is short, for example 64 bit). The client produces the zero-knowledge proof by hiding the value $t_n$ to the signatory.

Step (a0) advantageously comprises prior receipt by the processing means 11a of the equipment 10a of a nonce $\tau$ (the challenge, preferably by a predetermined length such as 64 bit), and generation of a condensate of a concatenation of the document and of the nonce completed by a padding block $\tau_{pad}$ to be called "auxiliary condensate" out of convenience in the present description (the condensate of the original document will be called per se the "main condensate"). The idea therefore is to modify the length of the nonce $\tau$ by means of padding and produce three proof systems which correspond to the three possible cases listed in Table 1. More precisely:

In case 1, is generated by the data-processing means 11a of the equipment 10a a zero-knowledge proof of the fact that $\exists x \in \{0,1\}^{256}, \exists a,b \in \{0,1\}^{512}, H(m)= h(x,a) \wedge H(m\|\tau_{pad})=h(x,b)$ In case 2, is generated by the data-processing means 11a of the equipment 10a a zero-knowledge proof of the fact that $\exists x \in \{0,1\}^{256}, \exists a,b,c \in \{0,1\}^{512}, H(m)= h(x,a) \wedge H(m\|\tau_{pad})=h(h(x,b),c)$ In case 3, is generated by the data-processing means 11a of the equipment 10a a zero-knowledge proof of the fact that $\exists x \in \{0,1\}^{256}, \exists a,b,c \in \{0,1\}^{512}, H(m)=h(h(x,a),b) \wedge H(m\|\tau_{pad})=h(h(x,a),c)$ Even if this table is designed for SHA-256, the skilled person can adapt it for other hash functions constructed with the Merkle-Damgard principle and determine adequate proofs to be generated.

Step (a) then comprises receipt (by the processing means 11b of the server 10b) of said auxiliary condensate $H(m\|\tau_{pad})$ (with the proof and the main condensate $H(m)$), and said nonce completed by a padding block $\tau_{pad}$. In other words, the client transmits $\tau_{pad}$ and the signatory selects one of the three proof systems as a function of $\tau_{pad}$: if $\tau_{pad}$ is 64 bits long this is in case number 3, if not its bit farthest the left starts with 0 in case number 1 and by 1 in case number 2. The data-processing means 11b of the server 10b then know which proposition to verify at step (b).

Summary of the Preferred Embodiment

In this particularly preferred embodiment, the method for generating an electronic signature of a document m associated with a condensate $H(m)$ obtained by a cryptographic hash function H iterating a compression function h as per the Merkle-Damgard principle, comprises the following steps:

(a0) By the processing means 11a of the equipment 10a:
  Receipt of a nonce (challenge r) generated and sent by the server 10b;
  Generation of the nonce completed by a padding block (response $\tau_{pad}$), said padding block being advantageously determined as a function of lengths of the nonce r and above all of said document m (preferably according to three diagrams according to the length of the document);
  generation of said condensate (main condensate $H(m)$) by application of said given hash function H to said document m;
  generation of a condensate of a concatenation $m\|\tau_{pad}$ of the document and of the nonce completed by the padding block (auxiliary condensate $H(m\|\tau_{pad})$) by application of the same given hash function (to said document to which the nonce completed by the padding block is concatenated);
  generation of a zero-knowledge proof of the fact that said (main) condensate is the result of application of said given hash function to said document; said proof being more precisely a zero-knowledge proof of the fact that the equipment 10a has a pre-image x such that said condensate $H(m)$ is the result of application of at least one iteration (in particular one or two) of the compression function h to said pre-image x; said proof more precisely being a zero-knowledge proof of the fact that the (main) condensate $H(m)$ and the (auxiliary) condensate of the concatenation of the document and of the nonce completed by the padding block $H(m\|\tau_{pad})$ are related by a given relation (referring to iterations of the compression function h); said given relation between the condensate $H(m)$ of the document and the condensate $H(m\|\tau_{pad})$ of the concatenation of the document and of the nonce completed by the padding block being preferably determined as a function of the length of said document $H(m)$. In the example of SHA-256, as a function of this length there are three cases according to which the relation is: $\exists a,b,c \in \{0,1\}^{512}$ such that either $H(m)=h(x,a) \wedge H(m\|\tau_{pad})=h(x,b)$;

or $H(m)=h(x,a) \wedge H(m\|\tau_{pad})=h(h(x,b),c)$;

or $H(m)=h(h(x,a),b) \wedge H(m\|\tau_{pad})=h(x,a),c)$;

where x is as explained the pre-image (length of 256 bit) the knowledge of which is proven;
  return to the server 10b of the (main) condensate $H(m)$, of the (auxiliary) condensate $H(m\|\tau_{pad})$ of the concatenation of the document and of the nonce completed by the padding block, of the nonce completed by the padding block $\tau_{pad}$, and of the proof;

(a) Receipt of these elements by the processing means 11b of the server 10b;

(b) determination by the processing means 11b of the server 10b of said relation proven by the proof as a function of the value received from the nonce completed by the padding block $\tau_{pad}$, and verification that said zero-knowledge proof is valid as a consequence (knowing the relation);

(c) generation of an electronic signature of the document from said (main) condensate $H(m)$, if the proof has indeed been verified and validated, and if needed return to the equipment 10a of the signature such that it produces the signed document, i.e. the original document with its attached signature.

Computer Program Product

In a second and a third aspects, the invention relates to a computer program product comprising code instructions to execute (in particular on the data-processing means 11a, 11b of the equipment 10a and/or of the server 10b) a method, according to the first aspect of the invention, for generating an electronic signature of a document associated with a condensate, as well as storage means readable by a computer equipment (a memory of the equipment 10a or of the second server 10b) containing this computer program product.

The invention claimed is:

1. A method for generating an electronic signature of a document associated with a condensate obtained by a given hash function comprising performing by data-processing means of a server of steps of:
   (a) Receiving said condensate and a zero-knowledge proof of the fact that said condensate is indeed the result of application of said given hash function to said document, wherein said zero-knowledge proof guarantees that given the condensate H received, the equipment having generated the proof has a document M such that h(M)=H where h is the given hash function, and said given hash function is a cryptographic hash function iterating a compression function;
   (b) Verifying that said zero-knowledge proof is valid;
   (c) Generating an electronic signature of the document from said condensate.

2. The method according to claim 1, wherein step (c) comprises application to the condensate of a function parameterized by a private key of an emitter of the document.

3. The method according to claim 1, wherein the zero-knowledge proof is a cryptographic object of zero-knowledge succinct non-interactive argument of knowledge (zk-SNARK) type.

4. The method according to claim 1, wherein said compression function uses the Merkle-Damgård principle.

5. The method according to claim 4, wherein said given hash function is selected from the functions of the SHA-1 or SHA-2 families.

6. The method according to claim 4, wherein said zero-knowledge proof of the fact that said condensate is indeed the result of application of said given hash function to said document is a zero-knowledge proof of the fact that the equipment has a pre-image such that said condensate is indeed the result of application of an iteration of the compression function to said pre-image.

7. The method according to claim 1, comprising a prior step (a0) of generation, by data-processing means of equipment having said document, of said zero-knowledge proof of the fact that said condensate is indeed the result of application of said given hash function to said document.

8. The method according to claim 7, wherein step (a0) further comprises prior generation of said condensate by application of said given hash function to said document.

9. The method according to claim 7, wherein step (c) comprises transmission of the generated electronic signature to said data-processing means of the equipment.

10. The method according to claim 9, comprising a subsequent step (d) of association by the data-processing means of the equipment of the electronic signature with the document so as to form the signed document.

11. The method according to claim 7, in step (a0) comprises prior receipt by the processing means of the equipment of a nonce, and generation of a condensate of a concatenation of the document and of the nonce completed by a padding block.

12. The method according to claim 11, wherein step (a) comprises receipt of the nonce completed by a padding block, and of said condensate of a concatenation of the document and of the nonce completed by the padding block.

13. The method according to claim 6 wherein step (a) comprises receipt of the nonce complete by a padding block, and of said condensate of a concatenation of the document and of the nonce completed by the padding block; and
   wherein said zero-knowledge proof of the fact that the equipment has a pre-image such that said condensate is indeed the result of application of at least one iteration of the compression function to said pre-image, is a zero-knowledge proof of the fact that the condensate of the document and the condensate of the concatenation of the document and of the nonce completed by the padding block are related by a given relation.

14. The method according to claim 13, wherein said given relation between the condensate of the document and the condensate of the concatenation of the document and of the nonce completed by the padding block is selected from a plurality of predetermined relations, step (b) comprising the determination of said relation as a function of the value received of the nonce completed by the padding block, and the verification of the proof as a consequence.

15. The method according to claim 14, wherein step (a0) comprises the determination of the padding block completing the nonce and the choice of said given relation between the condensate of the document and the condensate of the concatenation of the document and of the nonce completed by the padding block, as a function of lengths of said document and/or of the nonce.

16. A non-transitory computer program product comprising code instructions which when executed by a computer, generate an electronic signature of a document associated with a condensate obtained by a given hash function, said code instructions when executed:
   (a) receive said condensate and a zero-knowledge proof of the fact that said condensate is indeed the result of application of said given hash function to said document, wherein said zero-knowledge proof guarantees that given the condensate H received, the equipment having generated the proof has a document M such that h(M)=H where h is the given has function, and said given hash function is a cryptographic hash function iterating a compression function;
   (b) verify that said zero-knowledge proof is valid;
   (c) generate an electronic signature of the document from said condensate.

17. Non-transitory storage means readable by computer equipment on which a computer program product is stored, said computer program product comprising code instructions which when executed by a computer, generate an electronic signature of a document associated with a condensate obtained by a given hash function, said code instructions when executed:
   (a) receive said condensate and a zero-knowledge proof of the fact that said condensate is indeed the result of application of said given hash function to said document, wherein said zero-knowledge proof guarantees that given the condensate H received, the equipment having generated the proof has a document M such that h(M)=H where h is the given has function, and said given hash function is a cryptographic hash function iterating a compression function;
   (b) verify that said zero-knowledge proof is valid;
   (c) generate an electronic signature of the document from said condensate.

* * * * *